July 17, 1962  C. F. LOUTHAN  3,044,303
APPARATUS FOR BALANCING SPIN TUBS
Filed Oct. 18, 1957  2 Sheets-Sheet 1

INVENTOR.
Chester F. Louthan
BY Edwin S. Dybvig
HIS ATTORNEY

July 17, 1962 C. F. LOUTHAN 3,044,303
APPARATUS FOR BALANCING SPIN TUBS
Filed Oct. 18, 1957 2 Sheets-Sheet 2

INVENTOR.
Chester F. Louthan
BY Edwin S. Dybvig
HIS ATTORNEY

United States Patent Office 3,044,303
Patented July 17, 1962

3,044,303
APPARATUS FOR BALANCING SPIN TUBS
Chester F. Louthan, Dayton, Ohio, assignor to General Motors Corporation, Detroit, Mich., a corporation of Delaware
Filed Oct. 18, 1957, Ser. No. 691,044
3 Claims. (Cl. 73—460)

This invention relates to apparatus for balancing laundry tubs. More particularly, the invention relates to balancing spin tubs which incorporate a hollow ring filled with a granular ballast material.

Washing machines which incorporate a centrifuging operation into their operating cycle must provide means for offsetting unbalance arising during this centrifuging. In one type of spin tub balance during the spin cycle is achieved through the use of a ballast ring. In production, difficulty has been experienced in filling the cavity within the ballast ring so that a homogeneous mass results. Where the filler is not evenly distributed about the ballast ring, the tub is inherently unbalanced and such unbalance is imputed to any washing machine in which this tub is installed. To overcome the tub unbalance, this invention provides a method for determining the point of unbalance and means for redistributing the ballast material.

Accordingly, it is an object of this invention to balance laundry tubs having a ballast ring.

Further objects and advantages of the present invention will be apparent from the following description, reference being had to the accompanying drawings, wherein a preferred form of the present invention is clearly shown.

Figure 1:
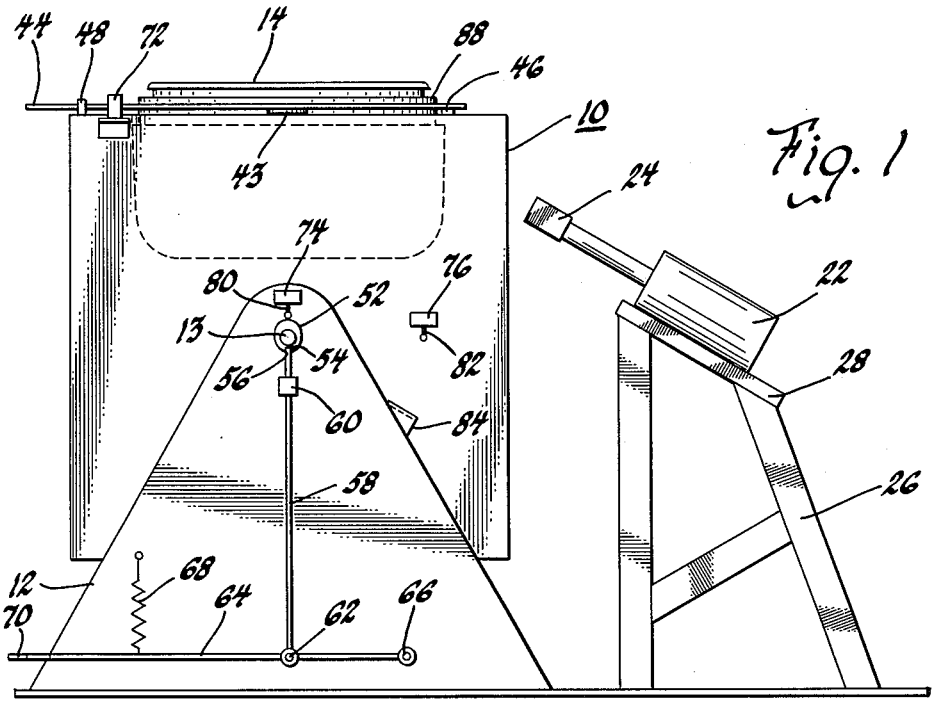
FIGURE 1 is a side view of the balancing apparatus showing the spin tub in position for determining the position of unbalance and the means for correcting the unbalance.
Figure 2:
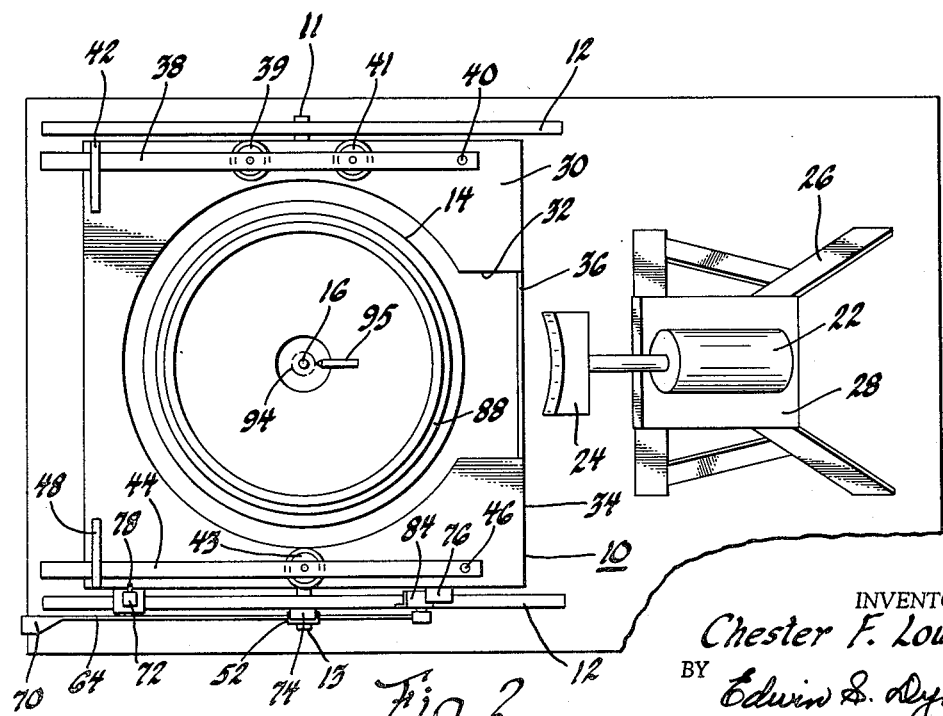
FIGURE 2 is a top view of the balancing apparatus.
Figure 3:
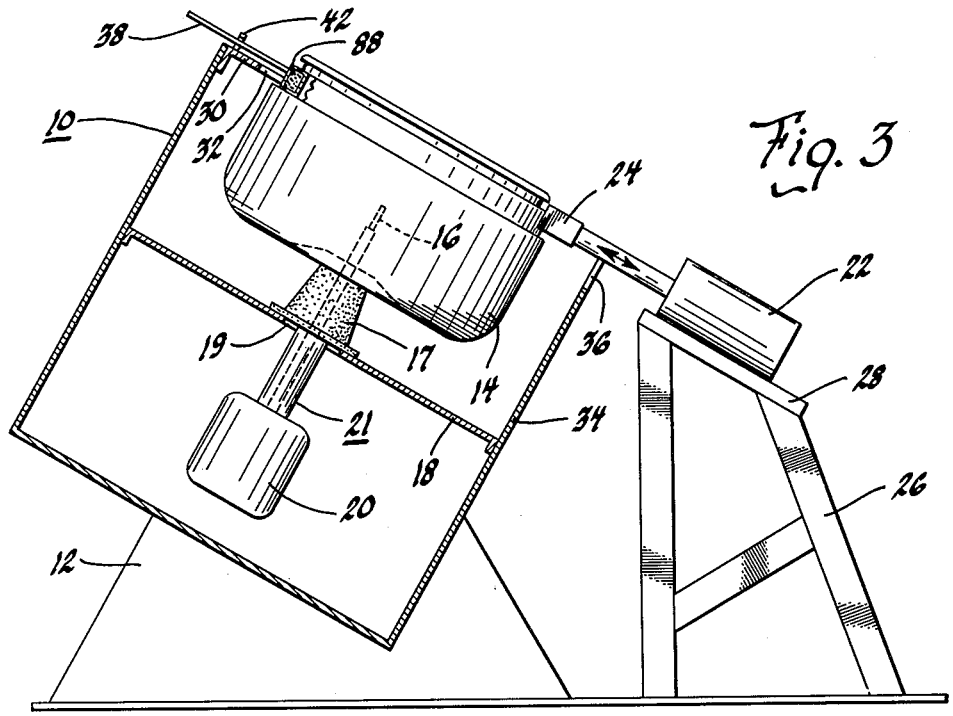
FIGURE 3 is a sectional view of the balancing apparatus showing the spin tub in position for correcting unbalance.

In accordance with my invention, as best seen in FIGS. 1 and 3, a cabinet or support structure 10, which forms a part of a test fixture, is pivotally supported by shaft segments 11, 13 journalled in a stand 12 and adapted to mount a laundry tub 14 on a test spindle or shaft 16. Spindle 16 is carried on support panel 18 and is adapted to be rotatably driven by a motor 20. An air hammer 22 having a striking member 24 is supported by a stand 26. The air hammer 22 is positioned by a plate 28 at an angle to place the striking member 24 in operative relationship when cabinet 10 is pivoted toward the striking member 24 (FIG. 3).

The top 30 of cabinet 10 is provided with an opening 32 to facilitate placing tub 14 in position for spinning. The side 34 of cabinet 10 is notched at 36 to permit the striking member 24 of the air hammer to strike the edge of the tub 14 when the cabinet is pivoted. In order to bring the tub to a quick stop after each spinning operation, a brake arm 38 is pivoted at 40 on cabinet top 30 and restrained for limited pivotal movement by a bracket 42. Similarly, a brake arm 44 is pivoted at 46 and restrained by bracket 48. Carried on brake arm 38 are resilient rollers 39 and 41 and on brake arm 44, roller 43.

The shaft segments 11, 13 are secured at one end to cabinet 10 in any suitable manner and journalled as aforesaid in stand 12. At the outer end of shaft segment 13 a cam 52 is attached for pivotal movement with the cabinet 10. The cam 52 is notched at 54 and adapted to receive the end portion 56 of a pivot lock rod 58. The rod 58 is journalled in a stationary boss 60 and pivotally secured at 62 to a foot actuator bar 64 having a pedal portion 70. The bar 64 is pivoted at 66 and adapted upon downward movement to release the rod portion 56 from notch 54. Pedal return to a normal shaft-locked position is effected through a spring 68 which biases the actuator bar upwardly.

To provide an adequate interlock system for the efficient operation of this invention, the apparatus may embody electrical switches 72, 74 and 76. Normally open switch 72 is mounted on cabinet 10 in a position whereby its actuating lever 78 may be engaged by brake arm 44. As arm 44 is pivoted outwardly from cabinet 10, the switch 72 is closed to energize motor 20. A switch 74, mounted on stand 12, has an actuating arm 80 which rides on the surface of cam 52. When the cabinet 10 is in an upright position, as seen in FIG. 1, the switch 74 is closed to permit energization of motor 20. As cabinet 10 and cam 52 are pivoted from the vertical, the switch is opened. When the cabinet 10 has been pivoted to the position of FIG. 3, it is also desirable to have the air hammer 22 energized automatically. For this purpose, a switch 76 is so located on cabinet 10 that the actuating lever 82 strikes a bracket 84 at the terminus of the cabinet's pivotal movement.

Figure 4:
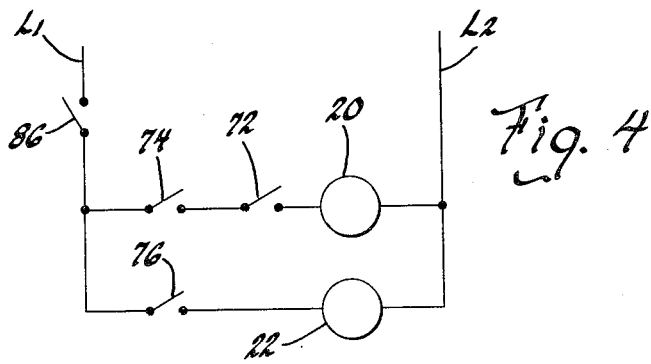
FIGURE 4 is a schematic wiring diagram effective to operate the apparatus of this invention.

With reference now to FIG. 4, the relationship which the above-described switches have to each other will now be clearly described. A master On-Off switch 86 may be provided in one leg of the main power supply $L_1$, $L_2$. Opening switch 86 will deenergize all operations. Switches 72 and 74 are shown in series with spin motor 20 and must both be actuated to permit the motor 20 to spin tub 14. Switch 74 insures that cabinet 10 is upright or in a vertical position before the motor 20 may be energized. For this purpose the cam 52 provides at its outer periphery a track whereby lever 80 of switch 74 is cammed into closed position whenever cabinet 10 is upright. The switch 72 is actuated by the pivotal movement of the hand-operated brake arm 44 and adapted to be energized or closed in response to the outward thrust of the arm by the operator. Therefore, with brake arm 44 moved outwardly and cabinet 10 in an upright position spin motor 20 is energized. Whenever it is sought to actuate air hammer 22, switch 76 is energized by rotating cabinet 10 into the position of FIG. 3. In this position, switch 76 is closed as lever 82 strikes bracket 84 and the air hammer is energized.

Figure 5:
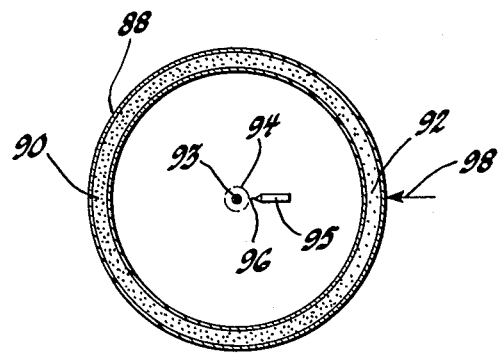
FIGURE 5 is a diagrammatic representation showing uneven distribution of the ballast material in the ring and the method for evenly distributing this material.

The principle here involved in balancing laundry tubs may best be explained wtih reference to FIG. 5 wherein a schematic representation is shown of a ballast ring with parts broken away. The granular material used to fill the annular ballast ring 88 is shown in a compacted or dense condition at 90, and in a lesser compacted condition at 92. This uneven distribution will cause the ring 88 to wobble as it is spun about an axis 93 fixed at one end and suitably attached to said ring. During the spin, the free end of axis 93 will follow a path of unbalance, shown generally by the dashed line at 94. Any marking instrument such as a pencil 95, may be placed at one point 96 along the orbit of the axis travel as an unbalance indicator. The mark so made will indicate the lesser dense side of the ring 88. The ring may then be struck a series of blows at the point of lesser density 98 and the granular substance within the ring redistributed to effect a homogeneous mass. It should be understood that an indication of unbalance during spin could as well be obtained by marking a point on the periphery of a wobbling ring 88. For instance, whereas a point on a balanced ring, spinning without wobble, travels on the horizontal plane, a point on the periphery of an unbalanced ring would fall outside this plane.

In operation, with all motors deenergized, a production laundry tub carrying a ring 88 is placed upon the spindle 16. With the cabinet 10 in an upright position, the operator may grasp brake arm 44 and thrust it outwardly to energize switch 72. The motor 20 will then spin the tub 14 to indicate any unbalance along an orbit 94 resulting from a non-homogeneous distribution of the granules filling the ballast ring 88. Sufficient horizontal play for the motor-spindle assembly shown generally at 21 may be provided in accordance with principles well known to the washing machine art. One free floating spindle arrangement has a resilient mount 17 supported on the panel 18. An aperture 19 is sized to accommodate the maximum horizontal offset which the spindle-motor assembly 21 will assume during the spin of an unbalanced tub. During the spinning operation and with the tub moving off-center at 94 to indicate unbalance, a mark is placed on the spindle 16, as described above. As set forth in connection with FIG. 5 the periphery of the tub could be used equally well for marking purposes. In this instance, the tub would move toward the point of unbalance and such point could be marked appropriately. The brake arms 44 and 38 are then squeezed toward each other so that the resilient rollers 39, 41 and 43 are urged into engagement with the upper periphery of tub 14. Pressure is applied to bring the tub to a halt. The mark on the spindle is then placed in line with the striking member 24 of air hammer 22 and the cabinet 10 released for pivotal movement by forcing shaft lock actuator bar 64 downwardly. The cabinet 10, with tub 14 correctly positioned, is next pivoted into operative engagement with the striking member 24. The air hammer vibrates the laundry tub and forces the granules into the less dense area, thus effecting a redistribution of the granules within the ballast ring. This process may be repeated until a complete balance is effected in the work product.

Although this invention has been described in regard to balancing a ballast ring which has been unevenly filled, the method has been found equally effective in correcting tub unbalance from other causes such as off-center spindle aperture, malformed ballast ring and any other tub imperfection arising during manufacture. In these situations the granular filler is redistributed within the ballast ring to offset the particular cause of unbalance in accordance with principles set forth hereinabove.

While the form of embodiment of the invention as herein disclosed constitutes a preferred form, it is to be understood that other forms might be adopted, as may come within the scope of the claims which follow.

What is claimed is as follows:

1. Balancing apparatus for a spin tub having a ballast filled ring comprising a box-like manually tiltable cabinet for supporting said tub and having a ported top wall and a side wall, a shaft segment on said side wall having a notched cam affixed thereto, a stand having an upstanding support portion for journaling said shaft segment between said side wall and said cam to pivotally support said cabinet between an upright position and a tilted position, a lock rod reciprocatingly supported on said support portion and movable between a raised position wherein said lock rod engages said cam notch to lock said cabinet in said upright position and a lowered position wherein said cam is released to permit said cabinet to be manually pivoted to said tilted position, a generally horizontal support panel fixed in said cabinet, a spindle laterally yieldingly and rotatably carried by said support panel and movable therewith, a spindle motor for rotating said spindle, said spindle at the upper end thereof having means for securing said spin tub for rotation therewith, a manually operable first brake arm laterally pivotally mounted on said top wall and having first and second resilient brake rollers in coplanar relationship with said ballast ring on one side of said tub, a manually operable second brake arm laterally pivotally mounted on said top wall and having a third resilient brake roller in coplanar relationship to said ballast ring on the other side of said tub, an air hammer adjacent said cabinet for correcting tub unbalance by redistributing said ballast and having an air hammer motor and a striker in juxtaposition to said ballast ring when said cabinet is in said tilted position, a power supply, and a control arrangement for said apparatus including a spindle motor switch on said side wall having a motor actuator in coplanar relationship to said second brake arm and actuatable to a closed position when said second arm is pivoted away from said ballast ring, a cabinet interlock switch on said support portion having an interlock actuator in engagement with said cam and actuatable to a closed position when said cabinet is in its upright position and to an open position when said cabinet is in its tilted position, an air hammer switch on said side wall having an air hammer switch actuator in coplanar relationship with said support portion and actuatable to an open position when said cabinet is in its upright position and to a closed position when said cabinet is in its tilted position, first circuit means connecting said spindle motor switch, said cabinet interlock switch, said spindle motor and said power supply in series flow relationship, and second circuit means in parallel flow relationship with said first circuit means and connecting said air hammer switch, said air hammer motor and said power supply in series flow relationship, said spindle being adapted to spin said tub when said cabinet is in said upright position and said second brake arm is manually pivoted away from said ballast ring and said striker being adapted to strike said ballast ring when said cabinet is manually tilted to said tilted position, whereby any unbalance in said tub may be sensed by the tub wobble and noted manually on said spindle or said ballast ring when said cabinet is in said upright position and corrected when said cabinet is manually tilted to and retained in said tilted position with the noted radial position of tub unbalance away from said striker until said ballast is sufficiently redistributed to balance said tub.

2. Balancing apparatus for a spin tub having a ballast ring comprising a box-like manually tiltable cabinet for supporting said tub and having a ported top wall and a side wall, a shaft segment on said side wall having a notched cam affixed thereto, a stand having an upstanding support portion for journaling said shaft segment to pivotally support said cabinet between an upright position and a tilted position, a lock rod movable between a first position wherein said lock rod engages said cam notch to lock said cabinet in said upright position and a second position wherein said cam is released to permit said cabinet to be manually pivoted to said tilted position, a support panel fixed in said cabinet, a spindle laterally yieldingly and rotatably carried by said support panel and movable therewith, a spindle motor for rotating said spindle, said spindle at the upper end thereof having means for securing said spin tub for rotation therewith, a manually operable first brake arm laterally pivotally mounted on said top wall and having first and second resilient rollers in coplanar relationship with a portion of said tub on one side of said tub, a manually operable second brake arm laterally pivotally mounted on said top wall and having a third resilient roller in coplanar relationship with a portion of said tub on the other side of said tub, an air hammer adjacent said cabinet for correcting tub unbalance and having an air hammer motor and a striker in juxtaposition to said ballast ring when said cabinet is in said tilted position, a power supply, and a control arrangement for said apparatus including a spindle motor switch on said cabinet having a motor actuator in coplanar relationship to one of said brake arms and actuatable to closed position when said brake arm is pivoted away from said tub, a cabinet interlock switch having an interlock actuator in engagement with said cam and actuatable to a closed position when said cabinet is in its upright position and to an open position when said cabinet is in its tilted position, an air hammer switch on said cabinet having an air hammer switch actuator in coplanar relationship with said support portion and actuatable to an open position when said cabinet is in its upright position and to a closed position when said cabinet is in its tilted position, first circuit means connecting said spindle motor switch, said cabinet interlock switch, said spindle motor and said power supply in series flow relationship, and second circuit means connecting said air hammer switch, said air hammer motor and said power supply in series flow relationship, said spindle being adapted to spin said tub when said cabinet is in said upright position and said brake arm is manually pivoted away from said tub portion and said striker being adapted to strike said ballast ring when said cabinet is manually tilted to said tilted position, whereby any unbalance in said tub may be sensed by the tub wobble and noted manually on said spindle or said ballast ring when said cabinet is in said upright position and corrected when said cabinet is manually tilted to and retained in said tilted position with the noted radial position of tub unbalance away from said striker until said ballast is sufficiently redistributed to balance said tub.

3. Balancing apparatus for a spin tub having a ballast ring comprising a box-like manually tiltable cabinet for supporting said tub and having a ported top wall and a side wall, a shaft segment on said side wall having a cam affixed thereto, a stand having an upstanding support portion for journaling said shaft segment to pivotally support said cabinet between an upright position and a tilted position, a lock rod movable between a first position wherein said lock rod locks said cabinet in said upright position and a second position for permitting said cabinet to be manually pivoted to said tilted position, a support panel fixed in said cabinet, a spindle laterally yieldingly and rotatably carried by said support panel and movable therewith, a spindle motor for rotating said spindle, said spindle at the upper end thereof having means for securing said spin tub for rotation therewith, a manually operable brake arm laterally pivotally mounted on said cabinet and having a resilient brake roller in coplanar relationship with a portion of said tub, an air hammer adjacent said cabinet for correcting tub unbalance and having an air hammer motor and a striker in juxtaposition to said ballast ring when said cabinet is in said tilted position, a power supply, and a control arrangement for said apparatus including a spindle motor switch on said cabinet having a motor actuator in coplanar relationship to said brake arm and actuatable to a closed position when said brake arm is pivoted away from said tub, a cabinet interlock switch having an interlock actuator in engagement with said cam and actuatable to a closed position when said cabinet is in its upright position and to an open position when said cabinet is in its tilted position, an air hammer switch on said cabinet having an air hammer switch actuator in coplanar relationship with said support portion and actuatable to an open position when said cabinet is in its upright position and to a closed position when said cabinet is in its tilted position, first circuit means connecting said spindle motor switch, said cabinet interlock switch, said spindle motor and said power supply in series flow relationship, and second circuit means connecting said air hammer switch, said air hammer motor and said power supply in series flow relationship, said spindle being adapted to spin said tub when said cabinet is in said upright position and said brake arm is manually pivoted away from said tub portion and said striker being adapted to strike said ballast ring when said cabinet is manually tilted to said tilted position, whereby any unbalance in said tub may be sensed by the tub wobble and noted manually when said cabinet is in said upright position and corrected when said cabinet is manually tilted to and retained in said tilted position with the noted radial position of tub unbalance away from said striker until said ballast is sufficiently redistributed to balance said tub.

References Cited in the file of this patent

UNITED STATES PATENTS

| | | |
|---|---|---|
| 1,183,745 | Ledyard | May 16, 1916 |
| 2,128,673 | Holstrom et al. | Aug. 30, 1938 |
| 2,170,848 | Bennett | Aug. 29, 1939 |
| 2,349,552 | Holmes | May 23, 1944 |
| 2,384,215 | Toulmin | Sept. 4, 1945 |
| 2,474,370 | Russell | June 28, 1949 |
| 2,492,092 | Bulliet | Dec. 20, 1949 |
| 2,614,312 | Rankin et al. | Oct. 21, 1952 |
| 2,650,133 | Lyon | Aug. 25, 1953 |
| 2,821,858 | King | Feb. 4, 1958 |

FOREIGN PATENTS

| | | |
|---|---|---|
| 368,800 | France | Dec. 13, 1906 |
| 458,554 | Germany | Apr. 13, 1928 |